D. MITCHELL.
CISTERN FILTER.
APPLICATION FILED MAR. 6, 1916.
1,200,126.
Patented Oct. 3, 1916.
2 SHEETS—SHEET 2.
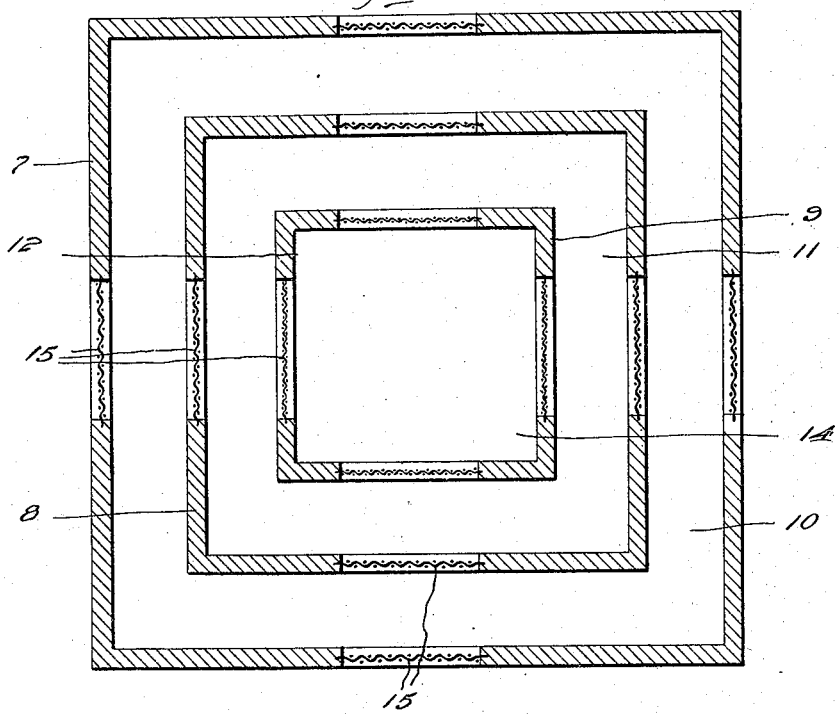
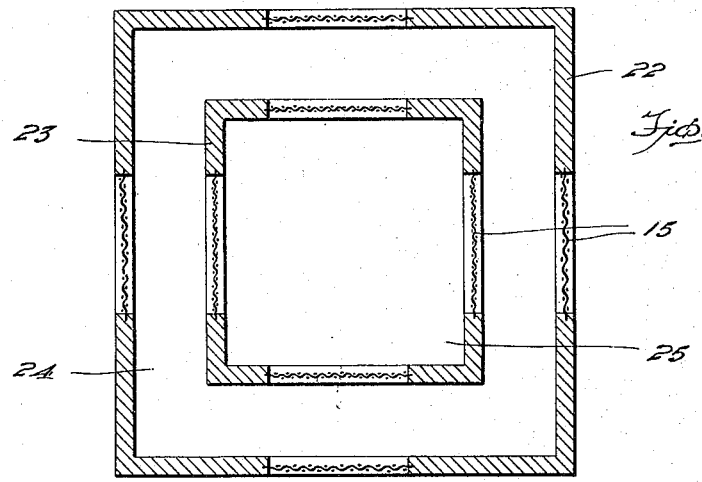
Inventor
David Mitchell

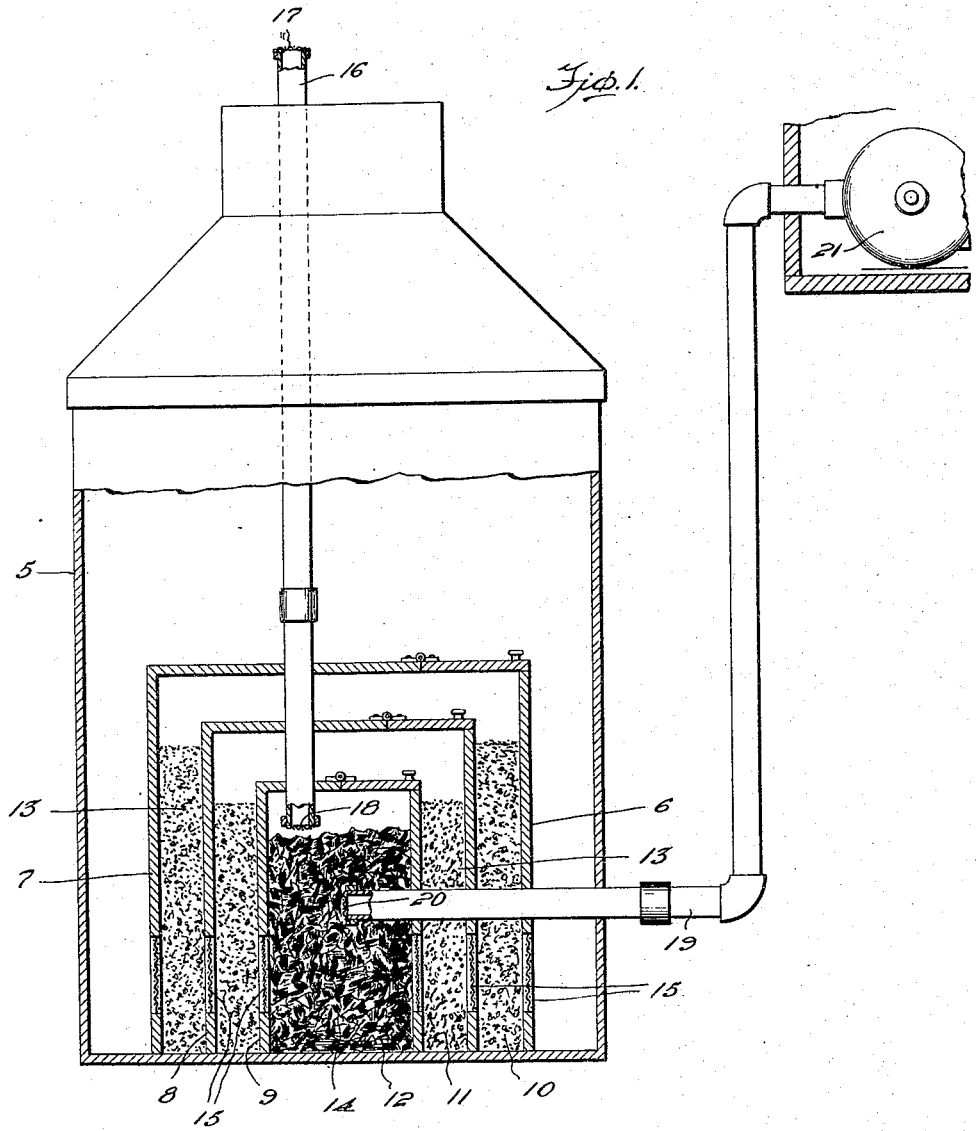

UNITED STATES PATENT OFFICE.

DAVID MITCHELL, OF ARMSTRONG, IOWA.

CISTERN-FILTER.

1,200,126.  Specification of Letters Patent.  Patented Oct. 3, 1916.

Application filed March 6, 1916. Serial No. 82,408.

*To all whom it may concern:*

Be it known that I, DAVID MITCHELL, a citizen of the United States, residing at Armstrong, in the county of Emmet and State of Iowa, have invented certain new and useful Improvements in Cistern-Filters, of which the following is a specification.

This invention relates to improvements in cistern filters, one object of the invention being the provision of a simple and inexpensive filter by means of which the water in the cistern is filtered and aerated just before it enters the intake pipe of the pump, thus insuring a clean purified water.

A further object of this invention is the provision of a cistern filter, in which several nested compartments filled with filtering material are adapted to rest upon the bottom of a cistern, the inner compartment having led thereinto an aerating pipe that communicates with the atmosphere, while an intake from a pump is also led therefrom, thus insuring a clear aerated water when delivered by the pump.

In the accompanying drawings:—Figure 1 is a sectional view of a cistern with the present filter in operable relation thereto. Fig. 2 is an enlarged section through the nested filtering compartments. Fig. 3 is a similar view to Fig. 2 of a modified construction of filter.

Referring to the drawings, the numeral 5 designates the cistern proper, which may be of any shape or size, there being mounted upon its bottom, the filtering device 6. This device consists of the three spaced nested boxes or receptacles 7, 8 and 9, which provide the outer filtering space 10, the intermediate filtering space 11, and the inner filtering and feed compartment 12. The spaces 10 and 11 are filled with gravel or sand or other filtering material 13, while the compartment is filled with charcoal 14. Each box is provided with a screen or foraminous portion 15, so that water from the cistern will enter the compartment 12. Led from the atmosphere is an aerating pipe 16, whose upper end is provided with a screen 17, while its lower end is also provided with a screen 18, and terminates within the compartment 12. Leading from the compartment 12 also, is a pump intake pipe 19, whose lower end is provided with a screen 20, the upper end being connected to the pump 21 of any desired construction. Thus with this construction and arrangement of filter, as the water is drawn out through the pump intake pipe, fresh air is admitted through the pipe 18 at the intake end of such pipe, so that the water in addition to being filtered by the materials contained in the spaces between the boxes and the compartment 12, is aerated, thus insuring clean and fresh water at the pump.

In the construction shown in Fig. 3, the filter consists of two boxes or receptacles 22 and 23, providing the filtering material holding space 24 and the compartment 25, the remaining mechanism being the same as heretofore described.

What I claim, as new, is:—

1. A device of the character described, comprising a plurality of spaced nested receptacles adapted to be placed within a cistern, the innermost receptacle forming a feed compartment, an aerating pipe extending from within the compartment to a point exteriorly of the cistern and having screened ends, charcoal filling a major portion of said compartment, screens arranged in the sides of said receptacle for establishing communication between the compartment and the cistern, filtering material within major portions of the other receptacles, and doors at the corners on the same side with each other of said receptacles.

2. A device of the character described, comprising a plurality of spaced nested receptacles adapted to be placed within a cistern, the innermost receptacle forming a feed compartment, an aerating pipe extending from within the compartment to a point exteriorly of the cistern and having screened ends, charcoal filling a major portion of said compartment, screens arranged in the sides of said receptacle for establishing communication between the compartment and the cistern, filtering material within major portions of the other receptacles, doors at the corners on the same side with each other of said receptacles, a pump, and an intake pipe leading from the compartment to said pump.

In testimony whereof I affix my signature.

DAVID MITCHELL.

Copies of this patent may be obtained for five cents each, by addressing the "Commissioner of Patents, Washington, D. C."